United States Patent

[11] 3,569,669

[72] Inventor Frank A. March
1913 N. Ode St., Arlington, Va. 22209
[21] Appl. No. 798,614
[22] Filed Feb. 12, 1969
[45] Patented Mar. 9, 1971

[54] PORTABLE HEAT STORAGE UNIT
9 Claims, 4 Drawing Figs.

[52] U.S. Cl. .................................................. 219/378,
2/2.1, 126/204, 165/46, 165/107, 219/211,
219/302, 219/530
[51] Int. Cl. ............................................. B63c 11/28,
F24h 7/04, H05b 1/00
[50] Field of Search......................................... 219/302,
211, 325, 326, 365, 341, 378, 530, 540; 165/1, 18,
104—108, 120, 46; 122/32, 33; 126/344, 4 (00),
204—210, 375, 101; 128/379, 400, 402, 403, 254;
2/2.1; 4/160, 165

[56] References Cited
UNITED STATES PATENTS

| 1,069,949 | 8/1913 | Hassler | 219/365 |
| 2,022,812 | 12/1935 | Roe | 219/365 |
| 3,112,792 | 12/1963 | Coleman et al. | 219/211 |
| 3,131,865 | 5/1964 | Roe | 126/101 |
| 3,182,653 | 5/1965 | Mavleos et al. | 219/378(UX) |
| 3,227,208 | 1/1966 | Potter | 219/325(UX) |
| 3,299,945 | 1/1967 | Rice et al. | 126/400X |
| 3,320,408 | 5/1967 | Mekjean | 219/378X |
| 3,356,828 | 12/1967 | Furness | 219/378X |
| 3,400,249 | 9/1968 | Mekjean et al. | 219/378 |
| 3,402,709 | 9/1968 | Shivers et al. | 165/46 |

FOREIGN PATENTS

| 940,879 | 6/1948 | France | 219/341 |
| 1,300,946 | 7/1962 | France | 219/341 |
| 1,017,665 | 1/1966 | Great Britain | 219/365 |

Primary Examiner—A. Bartis
Attorney—Finnegan, Henderson & Farabow

ABSTRACT: A system is provided for heating suits of free-swimming divers subjected to cold water. The system includes a heat storage unit that utilizes a combination of the latent heat of fusion and the sensible heat of a heat storage material having a latent heat of fusion of at least 35 cal./gm. and a melting point of at least 50° C. stored in a watertight container to heat at a desired rate a heat transfer fluid that is circulated between compartments in the diver's suit and the heat storage unit. An insulated envelope surrounds the container and defines with the container a conduit for passing heat transfer fluid in heat transfer relationship with the heat storage material. Heating means connectable to an external source are provided for initially heating the storage material. Control means are provided for increasing the effective heat transfer area and the overall heat transfer coefficient of the container after the latent heat of fusion has been extracted from the heat storage material so that the sensible heat can be extracted from the material at the desired rate.

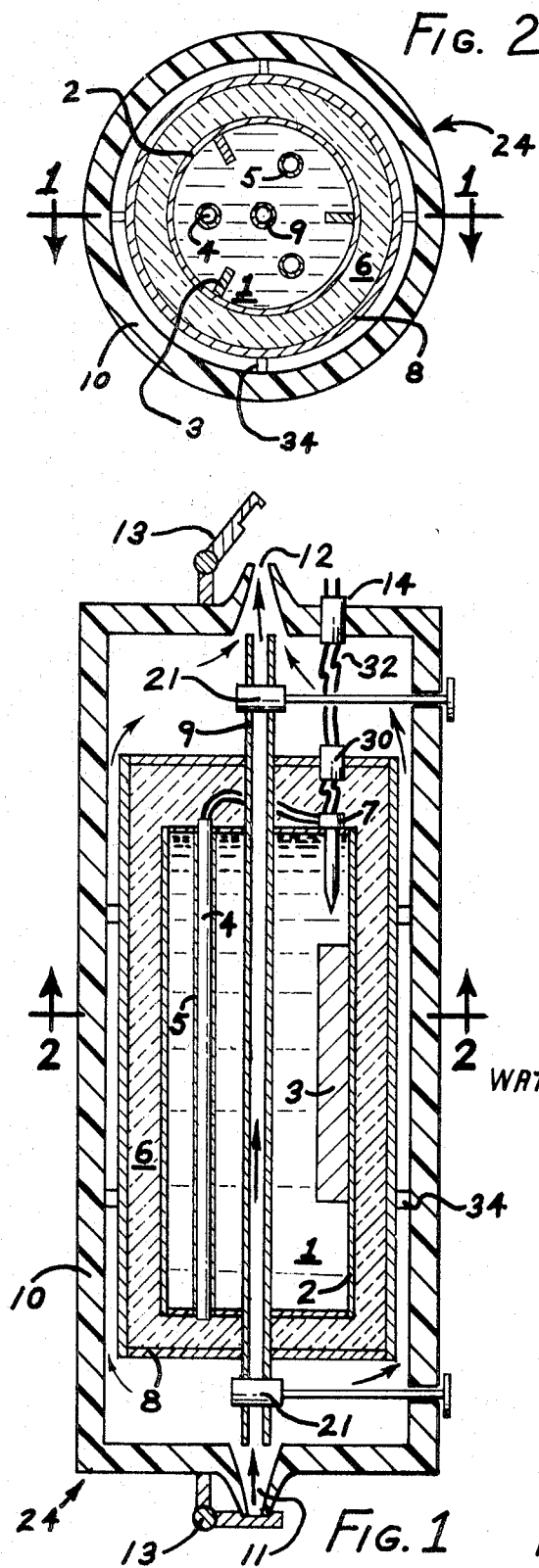
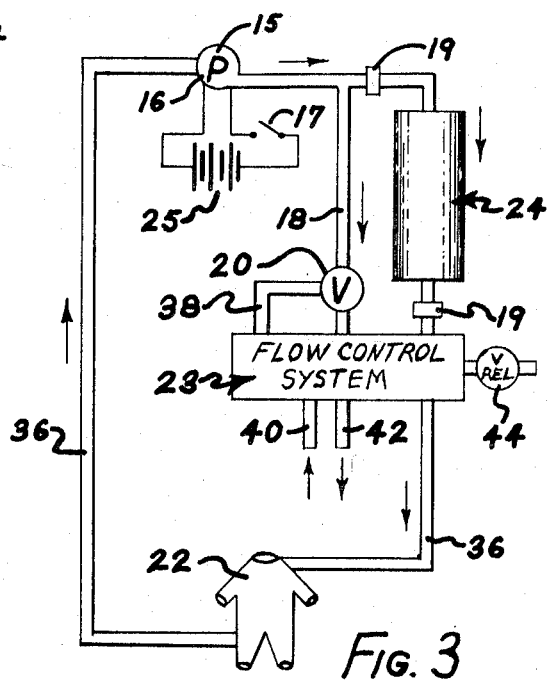
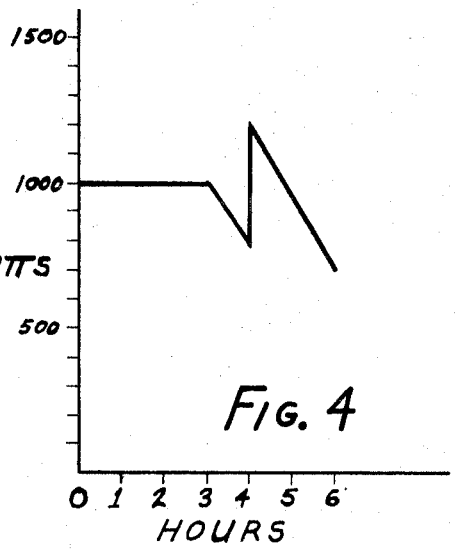
Fig. 1
Fig. 2
Fig. 3
Fig. 4
INVENTOR
FRANK A. MARCH
BY
FINNEGAN, HENDERSON &
FARABOW  ATTORNEYS

PORTABLE HEAT STORAGE UNIT

Recent developments in mixed gas saturation diving have permitted man to remain submerged at great depths for longer and longer time periods. Developments in auxiliary diver equipment, however, have not kept pace with the developments in breathing apparatus.

One of the most severe problems facing the modern diver is maintaining the thermal balance of his body in an environment which is essentially a cold and infinite heat sink. While the problem is far from new, it has been greatly magnified by the increases in exposure time.

A number of methods have been used to preserve the thermal balance of divers, among them: an electrically heated suit with power supplied from the surface, an electrically heated suit with power supplied by diver-carried batteries, a surface-supplied hot water suit, suits with heat supplied by exothermic chemical reactions, and a radioisotope-supplied hot water suit. All of these methods have had some disadvantages, either in control, cost, size, ease of handling, or deployment.

This invention proposes to overcome these disadvantages by the use of a heat storage unit utilizing a combination of the latent heat of fusion and the sensible heat of a suitable energy storage material.

It is an object of the invention to provide a compact, lightweight heat storage unit for use by divers in cold water, permitting submersion for relatively long periods of time.

Another object of the invention is to provide a heat storage unit which is readily recharged and easily used by field personnel.

Yet another object of the invention is to provide a heating apparatus which is relatively inexpensive and which can be constructed to meet the thermal demands of divers engaged in various activities and with various requirements for duration and quantity of heat.

A further object of the invention is to provide a method and apparatus which will deliver a desired rate of heat output over extended periods of time utilizing a minimum of heat storage material.

The invention includes a heat storage unit capable of storing heat over extended time periods and of delivering a sustained stable heat output to a heat transfer fluid being circulated through the unit. A heat of storage material having a latent heat fusion of at least 35 cal./gm. and a melting point of at least 50° C. is enclosed by a container. An insulating outer envelope surrounds the container and forms at least one conduit with the container for passing a heat transfer fluid in heat transfer relationship with the material. The envelope includes an inlet port and an outlet port communicating with the conduit. Heating means are provided for initially supplying heat to the heat storage material, the heating means being connectable to an external source of energy. A control means is provided for increasing the rate of heat transfer from the container and preferably includes means for increasing the overall heat transfer coefficient and/or the heat transfer area of the container.

The invention also includes apparatus for circulating the heat transfer fluid between passageways in the diver's suit and the heat storage unit comprising piping means for transmitting fluid from the interior of the passageways in the suit to the heat storage unit and back to the passageways; pumping means for moving fluid through the piping means, the heat storage unit and the passageways in the diver's suit; and flow control means for regulating the flow of heat transfer fluid to the unit to further control the temperature of the heat transfer fluid being supplied to the suit, the flow control means including a valved bypass line around the heat storage unit.

The invention also includes a method of supplying a desired rate of heat to a heat transfer fluid over an extended time period comprising heating a normally solid energy storage material positioned in a container to a temperature above its melting pint, thus converting it to a liquid; passing a heat transfer fluid over a given surface area of the container in heat transfer relationship with the material to extract the latent heat of fusion of the storage material at the desired heat output rate; and increasing the area and heat heat transfer coefficient of the container in contact with the moving heat transfer fluid after solidification of the heat transfer material has occurred, to permit the continued extraction of heat at the desired output rate.

Of the drawings:

FIG. 1 is a cross section view of a heat storage unit of this invention taken along line 1-1 of FIG. 2;

FIG. 2 is a cross section view taken along line 2-2 of FIG. 1;

FIG. 3 is a schematic flow diagram of a system for supplying heat transfer liquid to a diver's suit; and FIG. 4 is a graph showing heat output versus time for a heat storage unit constructed in accordance with the invention.

The heat storage unit 24 illustrated in FIGS. 1 and 2 includes a heat storage material 1 having a latent heat of fusion of at least 35 cal./gm., a high heat capacity, and a melting point of at least 50° C. A number of substances may be used for heat storage material, the optimum material for any application depending upon the size, weight, duration, and cost requirements of the heating system.

Where extreme light weight and long duration are required, metals and alkali metal salts, hydroxides, hydrides, and eutectics of these compounds may be employed. Heat storage materials in this class which have been found satisfactory include, but are not limited to the following: lithium fluoride, lithium hydride, lithium hydroxide, beryllium fluoride, a eutectic mixture of beryllium fluoride and lithium fluoride, sodium chloride, and sodium fluoride.

Where weight and duration requirements are less important, substances with slightly lower latent heats of fusion, heat capacities, and melting points may be sued. Such substances include organic anhydrides, acids, alkaloids, esters, waxes, oils, polymers, as well as certain inorganic salts and compounds. Heat storage materials in this class include, but are not limited to the following: beeswax, paraffin, high and low density polyethylene, carbowax, elaidic acid, methyl fumarate, succinic anhydride, hydroquinone, and lithium nitrate.

The heat storage material may also contain small amounts of corrosion-prevention additives, or additives to enhance the heat transfer properties of the storage material, particularly the heat transfer properties of the material in the solid state.

The heat storage material is enclosed in a watertight container 2 capable of withstanding the combined influence of corrosion and high temperature. The container can have internal fins 3 as shown in FIGS. 1 and 2 to augment the heat transfer properties of the container.

Materials for constructing the container 2 depend upon the particular heat storage material and its temperature-time cycle. For the high temperature, high latent heat systems alloys of nickel, cobalt, tungsten, chromium, and the like are required. Examples of materials which have been found suitable for specific high temperature applications include, but are not limited to, the following: Haynes Alloys No. 25 and 56, Hastelloy N and X, Inconel X-750, Incoloy 800, TD Nickel, and type 318 stainless steel.

For lower temperature applications using less corrosive heat storage materials, fiberglass, mild steel, aluminum, and the like may be used as container materials.

The container incorporates a heating means for initially supplying heat to the heat storage material prior to its use. As here embodied, the heating means comprises electric resistance heaters 4 which are positioned inside tubes 5 that run lengthwise through the heat storage container. An alternative embodiment, the initial heating means may include heating tapes, positioned around the outside of the heat storage container.

Insulation 6 substantially encloses container 2 and functions to regulate the rate of heat transfer from container 2 to the heat transfer fluid. A thermostat 7 is provided to prevent overheating of the device. The thermostat is placed outside heat storage container 2 with its probe extending into the material.

Thermostat 7 is usually set to discontinue the external supply of heat when the temperature of the heat storage material rises above its melting point.

The apparatus includes means for regulating the initial heat output of the system. This regulation may be accomplished by use of a suitable thickness of insulation 6, as previously mentioned. If only a small amount of insulating material is required, the thickness of the container 2 may be adjusted to give the proper heat flow without the use of additional insulation. When a low-melting heat storage material is used in conjunction with a container material with a relatively low thermal conductivity, such as fiberglass, insulation 6 can usually be omitted.

Insulating materials which may be used include, but are not limited to polystyrene and polyurethane foams, silicone elastomers, acrylic elastomers, multilayer superinsulations, sil-o-cel, carbon cellular foam, and vacuum.

The device includes an external shell 8 surrounding the insulating material to withstand the external pressure and to provide protection for the insulating material. Generally, no external shell will be required if the material of construction of container of 2 possesses a low heat transfer coefficient and the insulation layer can be omitted.

External shell 8 has a waterproof and pressuretight seal 30 for the lead wires 32 of electric resistance heater 4, and any other required thru-shell penetrations. The external shell may also have one or more tubes 9 extending through it and through heat storage container 2 for control purposes as hereinafter discussed.

Around external shell 8 is placed an envelope 10 which forms a conduit with the shell of the container to channel the flow of a heat transfer fluid around the container. As here embodied, envelope 10 and external shell 8 are each cylindrical and form an annular conduit, which serves both as a passage for heat transfer fluid and as an insulating barrier as described below. Spacers 34 of an insulating material are positioned between shell 8 and envelope 10 to support shell 8 in a fixed position relative to the envelope. Envelope 10 includes an entrance port 11 and an outlet port 12. This envelope is constructed of an insulating material to prevent the loss of heat to the external environment. The envelope has sealing means 13 for closing off the entrance and outlet ports of the envelope in order to prevent heat loss during transportation of the heated unit.

An electric socket 14 is located on the outside of the envelope to connect a suitable recharging current which resupplies heat to the heat storage unit after use.

In accordance with preferred forms of the invention, a control means is provided for varying the rate of heat transfer from the container. Preferably, the control means varies the effective heat transfer area and the overall heat transfer coefficient of the container. The control means permits selection of a desired rate of heat transfer from the container to adjust for varying environments.

The control means is also important to the successful provision of a light, compact heating unit which will sustain a desired heat output level over extended time periods. The control means permits sensible heat to be extracted from the heat storage material at a high rate to prolong the time span of the desired heat output level. When heat storage materials having high melting points and high heat capacities are used, the control means permits significantly reducing the mass of heat storage material necessary to attain a desired heat output level for a given period of time. Preferably, the control means comprise a fluid passage in communication with the conduit formed by the container and outer envelope, and valve means for opening and closing the passage. The fluid passage is positioned adjacent a surface of the container and preferably forms a part of the interior or exterior surface of the container.

Desirably, the passage is located within the container and comprises a tube formed of a material, such as a metal, which possesses a high thermal coefficient compared to the material of construction of the container and its insulating layer, if any. Thus, both the overall coefficient of heat transfer of the container, b.t.u./(hr.)(sq. ft. of surface area) (°F.), and the surface area of the container are increased by opening the tube.

As here embodied and as seen in FIG. 1, the control means comprises a metallic tube 9 located inside container 2. The tube is normally closed off at each end by valves 21. After the latent heat of fusion of heat storage material 1 has been exhausted and the heat output has dropped below that required by the diver, valves 21 are opened and the heat transfer fluid is allowed to flow through tube 9. This increases the effective heat transfer area and the overall coefficient of heat transfer of container 2 and thus increases the heat output of the system for a period of time. When the heat output again drops, if another tube were provided, it could be opened to again increase the effective heat transfer area.

With reference to FIG. 3, the heat storage unit is shown as part of an apparatus for supplying a heat transfer liquid to passageways in a diver's suit 22. The apparatus also includes piping means for transmitting liquid from the suit to the heat storage unit and back to the unit; pumping means for moving heat transfer liquid through the piping means, the heat storage unit, and the compartments in the diver's suit; and flow control means for preventing excessive temperatures in the diver's suit.

With reference to FIG. 3, a small pump 15 and motor 16 cause a heat transfer fluid to flow through the heat storage unit 24 and into the swimsuit 22. The pump preferably circulates the heat transfer fluid rapidly enough to prevent a large temperature difference between the inlet and outlet of the heat storage unit.

The pump motor may be driven by a number of means. As illustrated in FIG. 3, auxiliary batteries 25 are carried expressly for this purpose and an on-off switch 17 is provided for the pump motor. Alternatively, the pump could be driven by electrical energy supplied from thermocouples imbedded in the heat storage unit, by steam generated by excess heat from the heat storage unit, or by air from the diver's air tank.

FIG. 3 shows the schematic flow of the heat circulation system. Cooled fluid from the swimsuit is pumped through the heat storage unit, where it is warmed and then forced back into the diver's swimsuit. If the temperature of the heat transfer fluid entering the swimsuit becomes excessive, a bypass 18 is provided to cool it as described below.

The heat storage device 24 is equipped with suitable quick-disconnect couplings 19 for easily removing it from the rest of the system.

A flow control system generally 23 supplies heat transfer fluid at the proper temperature to the swimsuit. It does this primarily by means of a flow bypass 18, which as illustrated comprises a tube for exchanging heat with the environment, a valved discharge opening 42 for expelling hot heat transfer fluid and a valved opening 40 for taking cold heat transfer fluid, such as water, into the flow circuit. A flow control valve 20 may be operated automatically using a conventional electric or mechanical thermostat and a feedback loop 38, or manually by the diver. A relief valve 44 is provided as a safely device to prevent excessive pressure buildups.

The operating cycle of the present heating apparatus will now be described. External energy is supplied to the heat storage device 24 by plugging socket 14 into an external source of electricity. Thermostat 7 regulates the input of heat into the device and prevents overheating of the unit by discontinuing the supply of heat energy after the heat storage material reaches a desired temperature above its melting point. The annular conduit between outer envelope 10 and container 2 forms a heat insulating barrier when filled with a static gas or when exhausted to form a vacuum. Thus, closing inlet port 11 and outlet port 12 with sealing means 13 makes the heat storage unit an efficient insulator so that heat can be stored for long periods of time after heat is supplied. Thus, a scuba diver, for example, can charge the unit with heat at his home and transport the unit for long distances prior to its use.

Prior to use, sealing means 13 are removed from the inlet and outlet ports of unit 24 and the unit is connected to lines 36 as shown in FIG. 3. A heat transfer fluid such as water is then charged into the piping system and circulated through heat transfer unit 24 and the passageways of suit 22 by activating pump 15. Heat is transferred from container 2 to the heat transfer fluid at a given output rate during the time the heat storage material is changing from a liquid to a solid. Flow control system 23 adjusts the temperature of the heat transfer fluid flowing to suit 22, if necessary.

After the latent heat of fusion has been extracted from the heat transfer material, the rate of heat output from container 2 drops below the desired rate. The effective heat transfer area and the overall heat transfer coefficient of the container is then increased by opening valves 21 to permit heat transfer fluid to flow through tube 9. This permits extracting sensible heat from the heat storage material at the desired rate.

After each use, external energy can be again supplied to the heat storage unit to repeat the operating cycle.

FIG. 4 shows the heat output versus time for a 1000 watt system using lithium fluoride as the heat storage medium and containing one tube 9, which is opened when the heat output drops to 800 watts. The opening of the tube increases the heat output to 1200 watts, whereupon it drops off, this time more rapidly. It can be seen that the duration of a desirable level of heat output can be significantly increased by the use of one or more control tubes.

The present swimsuit heater apparatus may be used with open or closed-circuit swimsuits 22, although the closed-circuit variety is preferred because of the lower heat requirement. The suit may be of the type containing internal passageways or compartments through which hot water is circulated or may be of the type where the heated water is introduced directly into the water layer next to the diver's skin.

Although the invention has been described with respect to certain specific principles and details, it will be understood by those skilled in the art that these may be varied without departing from the spirit and scope of the invention.

I claim:

1. A heat storage unit capable of storing heat over extended time periods and of delivering a sustained heat output to a heat transfer fluid circulated through said unit, and comprising:
   a. a heat storage material having a latent heat of fusion of at least 35 cal./gm. and a melting point of at least 50° C.;
   b. a container enclosing said heat storage material;
   c. an insulating outer envelope encompassing said container and forming at least one conduit with said container for flow of heat transfer fluid in heat transfer relationship with the material, said envelope including an inlet port and an outlet port communicating with the conduit;
   d. heating means for initially supplying heat to the heat storage material, said heating means being connectable to an external source of energy; and
   e. a control means for varying the area of said container in contact with heat transfer fluid being passed through said unit to permit adjustment of the rate of heat transfer from said container and efficient removal of the sensible heat of said heat storage material after the latent heat of fusion has been extracted, said control means comprising at least one tubular member that extends across said container, with the walls of said tubular member in direct contact with the heat storage material along a major portion of the length of said tubular member, each end portion of said tubular member extending from said container and terminating within said conduit so that the interior of said tubular member is in flow fluid communication with said conduit, said control means also including a pair of valves, with one valve positioned at each end portion of said tubular member for opening and closing the interior of said tubular member to the flow of heat transfer fluid.

2. The heat storage unit of claim 1 which includes a thermostat which interrupts the supply of external energy to said heating means when said heat storage material achieves a temperature above its melting point.

3. The heat storage unit of claim 1 in which said envelope and said container are each cylindrical and said envelope encompasses said container to form an annular conduit around the sidewall of said container.

4. The heat storage unit of claim 3 including sealing means for closing said inlet and outlet ports when the unit is not in service to prevent fluid flow through said annular conduit and thus form a static heat insulating barrier around said container.

5. The heat storage unit of claim 1 in which said container has internal fins for promoting uniform transfer of heat from said heat storage material.

6. An apparatus for supplying heat transfer liquid to passageways in a diver's suit comprising:
   A. a heat storage unit comprising;
      a. a heat storage material having a latent heat fusion of at least 35 cal./gm. and a melting point of at least 50° C.,
      b. a container enclosing said heat storage material,
      c. an insulating outer envelope encompassing said container and forming at least one conduit with said container for flow of heat transfer liquid in heat-transfer relationship with the material, said envelope including an inlet port and an outlet port that permit the flow of heat transfer liquid into and out of said conduit,
      d. heating means for initially supplying heat to the heat storage material, said heating means being connectable to an external source of heat, and
      e. a control means for increasing the effective heat transfer area of said container to permit efficient removal of the sensible heat of said heat storage material after the latent heat of fusion has been extracted, said control means comprising a heat transfer fluid flow passage formed by a tubular member with the walls of said tubular member in direct heat exchange contact with said heat storage material, and the interior of said tubular member in fluid flow communication with said conduit; said control means also including a valve located at each end portion of said tubular member for opening and closing said fluid flow passage;
   B. piping means for transmitting liquid from the interior of the passageways in the suit to said heat storage unit and back to the passageways;
   C. pumping means for moving liquid through said piping means, said heat storage unit, and the passageways in the diver's suit; and
   D. flow control means for regulating the temperature of the heat transfer liquid supplied to the suit, said flow control means including a valved bypass line around said heat storage unit.

7. The apparatus of claim 6 in which said fluid passage is formed by a metallic tube which extends across said container.

8. The apparatus of claim 6 in which said envelope and said container are each cylindrical and said envelope encompasses said container to form an annular conduit around the sidewall of said container.

9. The apparatus of claim 6 including sealing means for closing said inlet and outlet ports when the heat storage unit is not in service to prevent fluid flow from said annular conduit, and thus form a heat insulating barrier around said container.